Patented June 16, 1953

2,642,384

UNITED STATES PATENT OFFICE 2,642,384

PROCESS FOR REFORMING OF HYDROCARBONS BOILING WITHIN THE GASOLINE RANGE UTILIZING A PLATINUM-ALUMINA-HALIDE CATALYST

Maurice W. Cox, Berwyn, Ill., assignor to Universal Oil Products Company, Chicago, Ill., a corporation of Delaware No Drawing. Application July 22, 1949,
Serial No. 106,335

7 Claims. (Cl. 196—50)

This invention relates to the catalytic conversion of hydrocarbon fractions containing naphthenes and paraffins. It is more specifically concerned with a particular method of reforming straight run gasolines and naphthas in the presence of hydrogen and platinum-alumina-halogen catalysts comprising platinum and alumina.

Catalysts comprising platinum, alumina, and halogen, particularly fluorine and chlorine, are especially useful in the reforming of hydrocarbons. Hydrocracking and isomerization of paraffins, and dehydrogenation of naphthenes are among the principal reactions that are promoted by these catalysts, which are capable of increasing the octane number of straight run gasolines and naphthas to values that are substantially higher than those that ordinarily can be reached by thermal reforming. In addition, the yield-octane number relationships realized with these catalysts are much better than are the corresponding relationships obtained in thermal reforming and in most of the prior catalytic reforming processes. By an appropriate selection of operating conditions, this catalyst can be used for a number of weeks and even months without regeneration. However, the activity of the catalyst gradually decreases with use due to several factors including deposition of carbonaceous material on the catalyst, possible poisoning of the catalyst by traces of impurities in the feed, and loss of halogen, particularly chlorine, from the catalyst during processing. At any event, as the activity of the catalyst declines it is necessary to compensate therefore if a product of constant quality is desired. I have found that the activity of the catalyst can be increased by adding to the reaction zone, a minor amount of a halogen compound that is reactable with, or that is convertible under the reforming conditions to a form that is reactable with, the alumina in the catalyst. The addition of the halogen compound usually increases the aromatizing activity, but the increase in isomerizing, and particularly in the hydrocracking activity generally is more pronounced.

In one embodiment my invention relates to an improvement in the reforming of a hydrocarbon charge stock containing paraffins and naphthenes and boiling within the gasoline range by contacting such charge stock and hydrogen with a catalyst comprising platinum and alumina at reforming conditions, said improvement comprising adding to the reforming zone a halogen compound reactable with the alumina at the reforming conditions, in an amount sufficient to increase the hydrocracking activity of the catalyst.

In a more specific embodiment my invention relates to a reforming process which comprises contacting hydrogen and a normally liquid hydrocarbon fraction containing paraffin and naphthenes and boiling below about 425° F. with a catalyst comprising platinum and alumina at a temperature of from about 750° to about 1000° F. and at a pressure greater than about 250 p. s. i. a., and regulating the halogen compound content of the reaction mixture to obtain the desired degree of hydrocracking.

In a broad aspect, my invention relates to the use of halogen compounds in the reforming of hydrocarbons in the presence of catalysts comprising platinum and alumina to control the balance between the various reactions promoted by said catalyst. For example, during the course of a reforming operation using a catalyst comprising platinum and alumina, it might become necessary to alter the quality of the reformate being produced or the product distribution being obtained. If it is desired to increase the amount of hydrocracking relative to the amount of aromatization, this can be accomplished simply and economically by adding a small amount of a halogen compound to the reaction zone, preferably in admixture with the charging stock. On the other hand, it is desirable in many instances to maintain the relative amounts of aromatization in hydrocracking substantially constant during a given run. If, in such a run, the hydrocracking activity of the catalyst declines more rapidly than the aromatizing activity, due perhaps to neutralization or inactivation of the acidic components of the catalyst by basic substances, poisons, or the like in the feed, the rate of hydrocracking can be increased to and maintained at the desired level by the addition of a halogen compound to the feed stock. My invention also can be employed with benefit in conjunction with the use of water in performing operations catalyzed by platinum-alumina-combined halogen catalysts. Water, or compounds that liberate water under the reforming conditions, can be added to the charge stock to suppress the hydrocracking activity of the catalyst. If too much water is used with the result that the hydrocracking activity is lowered too much, it can be raised to the desired value by adding the proper amount of halogen compound to the charge stock. The foregoing are merely illustrative of the many advantageous uses to which my invention can be put.

The hydrocarbon stocks that can be converted in accordance with my process comprise hydrocarbon fractions containing naphthenes and paraffins. The preferred stocks are those consisting essentially of naphthenes and paraffins although minor amounts of aromatics also may be present. This preferred class includes straight run gasolines, natural gasolines, and the like. The gasoline may be a full boiling range gasoline having an initial boiling point within the range of from about 50° to about 100° F. and an end boiling point within the range of from about 325° to about 425° F., or it may be a selected fraction thereof which usually will be a higher boiling fraction, commonly referred to as naphtha, and generally having an initial boiling point within the range of from about 125° to about 250° F. and an end boiling point within the range of from about 350° F. to about 425° F.

The catalysts comprising platinum and alumina and halogen that are preferred for use in my hydrocarbon reforming process may contain substantial amounts of platinum, but, for economic as well as for product yield and quality reasons, the platinum content usually will be within the range of from about 0.05% to about 1.5%. The catalyst ordinarily will contain a relatively minor amount, usually less than about 3% on a dry alumina basis, of a halogen, especially fluorine and chlorine. One method of preparing such catalysts comprises adding a suitable alkaline reagent such as ammonium hydroxide or carbonate to a salt of aluminum such as aluminum chloride, aluminum sulfate, aluminum nitrate, and the like, in an amount sufficient to form aluminum hydroxide, which upon drying, are converted to alumina. The halogen may be added to the resultant and slurry in the form of an acid such as hydrogen fluoride or hydrogen chloride, or as a volatile salt such as ammonium chloride. The fluoride ion appears to be somewhat more active in promoting hydrocracking than other members of the halide group and, therefore, somewhat smaller amounts of this member of the halide group ordinarily are used. Although my invention ordinarily will be carried out employing platinum-alumina-halogen catalysts, it can be employed also when the catalyst initially charged to the reforming unit comprises essentially platinum and alumina with little or no halogen. During the course of the operation as the halogen compound is charged to the reaction zone, some of the halogen compound is absorbed by or reacted with the catalyst thus yielding the platinum-alumina-halogen catalyst.

A satisfactory method of adding platinum to the alumina-halogen composite comprises preparing a colloidal suspension of platinic sulfide by introducing hydrogen sulfide into an aqueous solution of chloroplatinic acid until said solution reaches a constant color, which usually is a dark brown. The resultant colloidal suspension of platinic sulfide is commingled with the aluminum hydroxide slurry at room temperature followed by stirring to obtain intimate mixing. The resulting material is then dried at a temperature from about 200° to about 400° F. for a period of from about 4 to about 24 hours or more to form a cake. This material may then be converted into pills or other shaped particles. Thereafter the catalyst may be subjected to a high temperature calcination or reduction treatment prior to use. It is to be understood that the foregoing method of preparing satisfactory platinum-alumina catalyst is merely illustrative and is not to be taken in a limitative sense, inasmuch as various other methods may be employed to produce satisfactory catalysts of this type.

The exact manner in which the halogen or halide ion is present in the catalyst is not known, although it is believed to be present in the form of a chemical combination or loose complex with the alumina and/or platinum components. Because the exact chemical constitution of such halogen containing catalysts is not known, I sometimes refer to them as catalysts comprising platinum, alumina and halogen or catalysts comprising platinum, alumina, and combined halogen.

Palladium-alumina catalysts sometimes can be used in my process.

The halogen compound employed in my process comprised those halogen compounds that are capable of reacting with the alumina in the catalyst at the reforming condition or that undergo conversion in the reaction zone to a form that is reactable with the alumina at said conditions. Such halogen compounds include hydrogen chloride, chlorine, ammonium chloride, monochloro acetic acid, trichloro acetic acid, carbon tetrachloride, chloroform, tertiary butyl chloride, hydrogen fluoride, cyclohexo fluoride, isopropyl fluoride, tertiary butyl fluoride, hydrogen bromide, bromine, and di-chloro di-fluoromethane. These compounds are not necessarily equivalent in their effect upon the catalyst. A given amount of one compound often will increase the hydrocracking activity considerably more than a given amount of another compound. In addition, some of the compounds are completely adsorbed or reacted with the catalysts during passage through the reaction zone; whereas when other compounds are employed, only a portion is adsorbed or reacted with the catalyst. In addition, when a multiple catalyst bed system is employed, some of the compounds are adsorbed primarly in the first beds whereas other of the compounds are primarily adsorbed in the subsequent beds. The halogen in the halogen compound that is added to the charge may be the same as the halogen in the catalyst. However, this is not necessary since good results are obtained when the halogens are dissimilar.

In the operation of my process, the halogen compound may be added in the required amount to the charging stock or it may be added directly to the reaction zone. The halogen compound may be added continuously, although it frequently is more desirable to add it intermittently as needed. If quantitative data on the effect of the particular halogen compound are available, it is a simple matter to determine the amount of said halogen compound that should be added to the charging stock or to the reaction zone to obtain the desired degree of hydrocracking. However, if such data are not available, it is possible to ascertain whether the amount of halogen compound being added to the charging stock in a multiple adiabatic reactor system is correct by observing the total temperature drop through the reactors. For example, if a fresh catalyst is giving a satisfactory product distribution at a given total $\Delta T$, then the amount of halogen compound added as the run progresses should be such as to maintain the total ΔT essentially constant. If this procedure is followed, the ratio between hydrocracking and aromatization will be held substantially constant and, consequently, the product distribution will remain approximately the same as that experienced early in the run. However, it is evident to one skilled in the art that this is only an approximation, although it is a rather accurate approximation. If a substantial change in heat capacity of the material in the reaction zone has taken place by means such as a variation in the ratio or the composition of the recycle gas, this fact also should be taken into account. In such a case, the more accurate procedure would be to keep the product of heat capacity and ΔT substantially constant in order that the ratio between hydrocracking and aromatization be maintained substantially constant. In a similar manner, the desired increase in the amount of hydrocracking can be achieved by observation of ΔT's if the heat of hydrocracking is known.

Hydrocarbons may be reformed in accordance with my process using fluidized, fluidized-fixed bed, suspensoid, and moving bed types of processes. However, I prefer to use fixed bed processes, primarily because operations of this type tend to minimize attrition losses of the relatively expensive catalyst. One fixed bed method of utilizing my invention comprises preheating hydrogen and hydrocarbon charge stock to a conversion temperature, and passing the same in admixture with the requisite amount of halogen compound through a plurality of substantially adiabatic reaction zones containing platinum-alumina-halogen catalyst. In all but the last stages the reaction is endothermic, hence the reactant streams passing between the reaction zone are reheated to the desired conversion temperature. Reformed hydrocarbons are recovered, and the hydrogen is separated and recycled to the reaction zone. Another type of fixed bed process that is particularly suitable for certain types of operation comprises passing the hydrocarbon charging stock together with hydrogen and the requisite amount of halogen compound through tubes containing catalyst, said tubes being subjected to radiant heat from a radiant flame and the resulting hot products of combustion. Here again, the reformate is recovered and the hydrogen is separated and recycled to the reaction zone.

Hydrocarbon reforming operations carried out in accordance with my invention ordinarily will be conducted at temperatures of from about 750° F. to about 1000° F. At temperatures in the vicinity of 750° F. and lower, the aromatic-naphthene equilibrium is unfavorable, the reaction rates are quite low, and very low space velocities must be employed to obtain appreciable conversion. At temperatures in excess of 1000° F., a significant amount of thermal reaction takes place accompanied by a poorer liquid recovery and more rapid catalyst deactivation.

The pressures at which my process will be conducted will lie within the range of from about 50 to about 1200 lbs. per square inch; a total pressure of at least 250 lbs. ordinarily is preferred. The weight hourly space velocity, which is defined as the weight of hydrocarbon charge per hour per weight of catalyst in the reaction zone, should lie within the range from about 0.2 to about 40. The amount of hydrogen charged along with the hydrocarbon usually will be from about 0.5 to about 15 mols per mol of hydrocarbons.

The following example is given to illustrate my invention, but it is to be understood that it is given for illustrative and not for limitative purposes.

Example

A 216–337° F. Pennsylvania straight-run naphtha was reformed in the absence and in the presence of added t-butyl-chloride by passing the charging stock and hydrogen through a reaction tube containing catalyst. The catalyst comprised alumina containing 0.1% platinum and 0.24% chlorine and was made by the process outlined above. The reaction tube was positioned within an aluminum-bronze block surrounded by an electrical heater. The operating conditions and results are shown in the following table:

| Run No. | 1 | 2 |
|---|---|---|
| t-Butyl chloride, cc./liter of charge stock | 0 | 0.5 |
| Block temperature, °F. | 910 | 911 |
| Minimum temp. in catalyst bed, °F. | 889 | 911 |
| Hourly liquid space velocity | 2.0 | 2.0 |
| Pressure, p. s. i. g. | 500 | 500 |
| Hydrogen/hydrocarbon molal ratio | 2.8 | 2.8 |
| Duration of run, hours | 25 | 22 |
| Properties of reformate: | | |
| Reid vapor pressure, lbs. | 9.4 | 10.8 |
| F-2 clear octane No. | 70.7 | 75.2 |
| ASTM distillation: | | |
| IBP, °F. | 87 | 89 |
| 5% | 126 | 106 |
| 10 | 153 | 122 |
| 30 | 216 | 183 |
| 50 | 243 | 232 |
| 70 | 271 | 264 |
| 90 | 316 | 312 |
| 95 | 356 | 342 |
| EP | 364 | 386 |
| Per cent over | 95.5 | 97.0 |
| Per cent bottoms | 1.0 | 1.0 |

It can be seen that the presence of t-butyl chloride in the charging stock markedly increased the hydrocracking activity of the catalyst. This is shown by the higher octane number and the lower boiling range of the reformate and by the higher catalyst temperature. The concentrations of t-butyl chloride was too high for good catalyst life at these particular operating conditions. This is shown by the fact that the octane number of the product continuously decreased after Run 2 due to increased carbon deposit on the catalyst. In normal operation, the rate of catalyst carbon deposit and the rate of octane number decrease is very slow. A t-butyl chloride concentration of about 0.1–0.2 ccs. per liter of charge stock gives almost as much octane number appreciation with substantially no increase in the rate of catalyst carbon deposition. On the other hand, the carbon deposition rate could have been restricted in Run 2 by increasing the hydrogen partial pressure in the reaction zone. This could have been done by increasing the total pressure or by increasing the hydrogen/hydrocarbon molal ratio. Thus it can be seen that any increased tendency toward higher carbon deposition rates can be offset by simple adjustments in the other operating variables. As a result, the advantages of halogen compound addition to the charging stock can be realized without concomitant disadvantages.

From the foregoing it can be seen that I have invented an improvement in the reforming of hydrocarbons in the presence of catalyst comprising platinum and alumina, said improvement permitting a greater degree of flexibility in the composition of the catalyst and in the relative amounts of hydrocracking reaction that is obtained.

I claim as my invention:

1. In the reforming of a hydrocarbon charge stock containing paraffins and naphthenes and boiling within the gasoline range by contacting said stock and hydrogen with a catalyst comprising platinum, alumina and combined halogen at reforming conditions, the improvement which comprises adding tertiary butyl chloride to the reforming zone and reacting the same with the alumina in an amount sufficient to increase the hydrocracking activity of the catalyst.

2. In the reforming of a hydrocarbon charge stock containing paraffins and naphthenes and boiling within the gasoline range by contacting said stock and hydrogen in a reforming zone with a catalyst comprising platinum, alumina and combined halogen at paraffin hydrocracking and naphthene dehydrogenating conditions including a temperature of from about 750° to about 1000° F. and a pressure of from about 50 to about 1200 pounds per square inch, wherein the extent of the hydrocracking reaction tends to decrease with continued use of the catalyst, the improvement which comprises introducing to said zone, during the reforming of said stock therein and while said catalyst still retains substantial naphthene dehydrogenating activity, a halogen compound reactable with the alumina at said conditions and reacting a sufficient amount of said compound with the alumina to maintain the hydrocracking activity of the catalyst substantially constant.

3. The improvement as defined in claim 2 further characterized in that said halogen compound is continuously introduced to the reforming zone in admixture with said stock.

4. The improvement as defined in claim 2 further characterized in that said halogen compound is intermittently introduced to said zone as the catalyst exhibits decreased hydrocracking activity.

5. The improvement as defined in claim 2 further characterized in that the halogen of said halogen compound is fluorine.

6. The improvement as defined in claim 2 further characterized in that the halogen of said halogen compound is chlorine.

7. The improvement as defined in claim 2 further characterized in that said halogen compound is an alkyl chloride.

MAURICE W. COX.

References Cited in the file of this patent

UNITED STATES PATENTS

| Number | Name | Date |
|---|---|---|
| 2,324,708 | Liedholm | July 20, 1943 |
| 2,348,702 | Schmerling et al. | May 9, 1944 |
| 2,397,639 | Berg et al. | Apr. 2, 1946 |
| 2,430,724 | Meadow | Nov. 11, 1947 |
| 2,430,735 | Ray et al. | Nov. 11, 1947 |
| 2,479,110 | Haensel | Aug. 16, 1949 |
| 2,582,428 | Haensel | Jan. 15, 1952 |